May 7, 1929.  W. F. KOCH  1,711,950
SPOTLAMP
Filed March 25, 1927
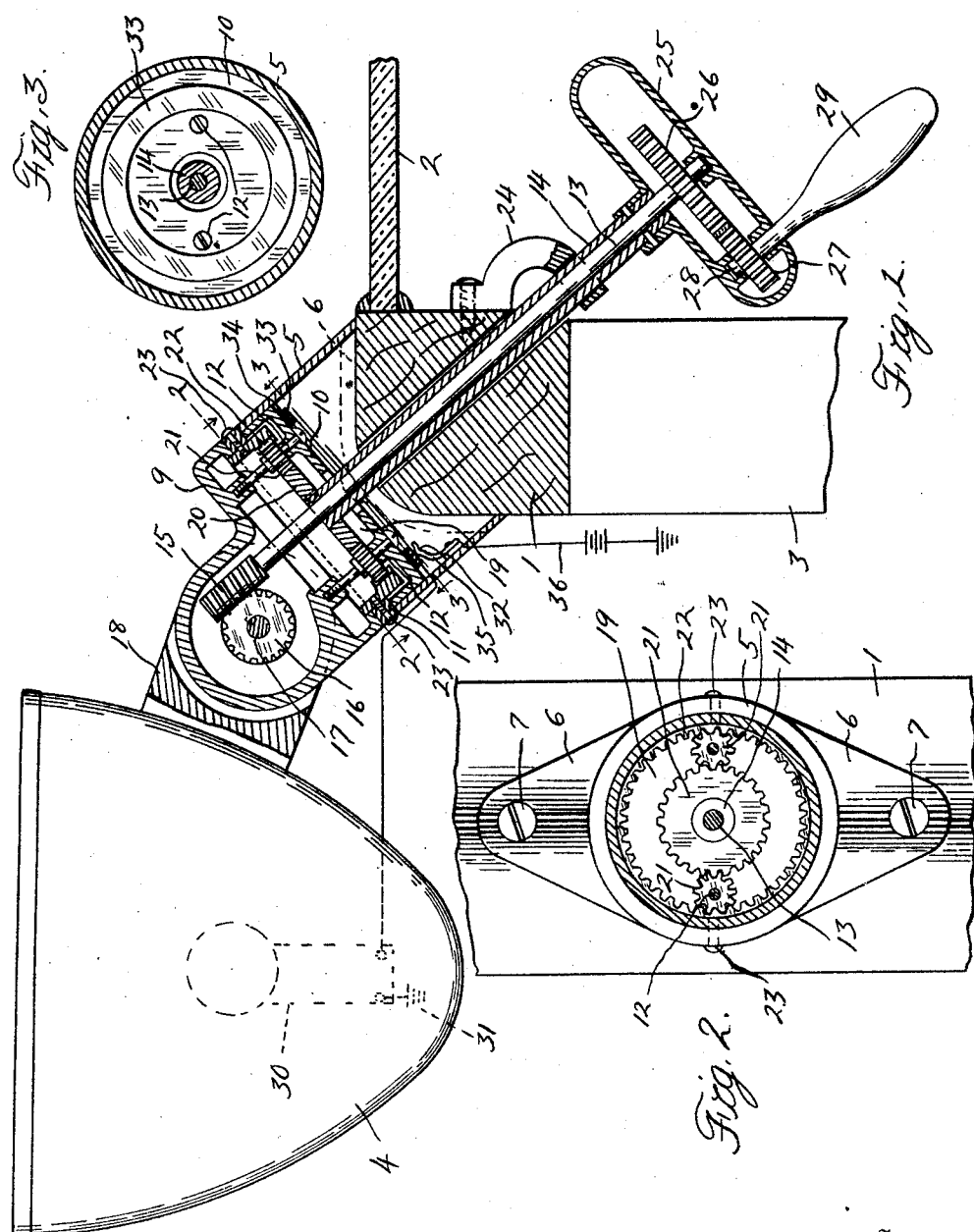
Inventor
William F. Koch
By
J. J. Murray
Attorneys Patented May 7, 1929.

1,711,950

UNITED STATES PATENT OFFICE.

WILLIAM F. KOCH, OF DETROIT, MICHIGAN, ASSIGNOR, BY MESNE ASSIGNMENTS, TO GREAT LAKES MANUFACTURING COMPANY, OF DETROIT, MICHIGAN, A CORPORATION OF DELAWARE.

SPOTLAMP.

Application filed March 25, 1927. Serial No. 178,321.

This invention relates to vehicle spot lamps and relates particularly to a control mechanism for such spot lamps.

It is an object of the invention to provide a simple mechanism for adjusting a spot lamp mounted upon a vehicle body to turn about either a vertical or a horizontal axis so as to control the angle of the beam from said lamp with respect to the ground and also with respect to the direction of travel of the vehicle.

Another object is to mount a spot lamp exteriorly upon the front portion of a vehicle body and to provide a simple mechanism operable from within said body for rotating the spot lamp about either a horizontal or vertical axis.

A further object is to provide control mechanism for a spot lamp including a pair of co-axial shafts and a provision for actuating the spot lamp about a vertical axis by one of said shafts and about a horizontal axis from the other, both of said shafts being actuable by a crank handle which is rotatable on its own axis to drive one of the shafts and rotatable about the common axis of said shafts to drive the other shaft.

These and various other objects the invention attains by the construction hereinafter described and illustrated in the accompanying drawings, wherein:—

Figure 1 is a plan view partially in section of the spot lamp control mechanism as installed upon one of the front corner posts of a vehicle.

Figure 2 is a sectional view of the same taken upon the line 2—2 of Figure 1.

Figure 3 is a cross sectional view upon the line 3—3 of Figure 1.

In these views the reference character 1 designates the front corner post of the closed body of a motor vehicle, 2 a windshield extending in a well-known manner from said post across the front of the vehicle, and 3 a door or other member abutting said post and closing a side of the vehicle body. The spot lamp 4 to which my improved control mechanism is applied may be of any suitable construction. To mount the spot lamp an approximately cylindrical housing 5 is mounted exteriorly of the vehicle body upon the post 1, the axis of said body being preferably an approximate diagonal of said post. In the illustrated embodiment of the invention the housing 5 has a pair of flanges 6 projecting integrally from its top and bottom which are secured to the post 1 by suitable screws 7, or the like. The rear edge of the housing 5 will preferably have an approximate V-form adapting it to conform to the front and side faces of the engaged post.

Against the front face of the housing 5 there is seated a hollow head 9 which, as will presently appear, is adapted for rotation about the axis of said housing. Within the front portion of the housing 5 there is mounted a collar 10 which seats against an annular flange 11 formed interiorly integral with said housing and which is attached to the head 9 by a pair of screws 12 to hold said head in proper relation to the housing. By virtue of the screws 12 the collar 10 and head 9 are adapted to rotate in unison with respect to the housing 5.

A shaft 13 and an enclosing tubular shaft 14 are extended axially of the housing 5 through the post 1, the tubular shaft 14 terminating within said housing and the shaft 13 projecting through the housing and into the rotative head 9. Within said head a worm 15 fast upon said shaft meshes with a worm wheel 16 fast upon a shaft 17 transverse to the shafts 13 and 14. The shaft 17 projects above the head 9 and has keyed, or otherwise rigidly secured thereto, a bracket member 18 which carries the spot lamp 4.

The collar 10 is chambered as indicated at 19 to receive a gear 20 fast upon the tubular shaft 14 and to further receive a pair of pinions 21 journaled respectively upon the shanks of the screws 12 and meshing with the gear 20. The pinions 21 further mesh with a stationary internal gear 22 which is secured to the flanges 11 by screws 23, or other suitable means. Interiorly of the vehicle the post 1 carries a bracket 24 rotatably mounting the tubular shaft 14 and rearwardly of said bracket there is mounted fast upon said tubular shaft a gear housing 25 within which a gear 26 is mounted fast upon the shaft 13. Said housing also contains a pinion 27 meshing with the gear 26 and mounted upon a stub shaft 28 journaled in the outer portion of the housing 25 and carrying a crank handle 29 projecting rearwardly from said housing.

One of the terminals of the bulb socket 30 of the spot lamp may be grounded to the casing of said lamp as indicated at 31 and the other terminal thereof may be a suitable electrical contact 32 to a ring 33 co-axially carried by the collar 10 upon the rear face thereof but insulated from said collar as indicated at 34. A leaf spring 35 forms a brush contact member bearing upon the ring 33 and maintaining an electrical connection thereto in all positions of rotation of the head 9. It will be understood that the brush 35 is included in a suitable circuit such as is diagrammatically illustrated at 36.

In the use of the described control mechanism when it is desired to swing the spot lamp about a vertical axis so as to laterally vary the direction of the beam emitted thereby, the crank handle 29 is rotated upon its own axis, thus employing the pinion 27 and gear 26 to drive the shaft 13 and causing the vertical shaft 17 to be driven through the worm 15 and worm wheel 16 whereby the spot lamp is turned in unison with said shaft.

In order to vary the angle of the spot lamp beam with respect to the ground the crank handle 29 is turned in unison with the gear housing 25 about the common axis of the shafts 13 and 14, thus rotating both of said shafts. Under these conditions the head 9 is driven from the tubular shaft through the gear train 20, 21, 22, the pinions 21 undergoing a planetary travel about the gear 20 to carry said head around. It will be evident that the rate of rotation of the head will be equal to substantially half the rate of actuation of the crank handle 29 and housing 25. When the desired angle of the spot lamp axis with respect to the ground has been established the crank handle may be rotated, if desired, on its axis to counteract such rotation laterally as the spot lamp may have received during the adjustment just described.

The described control mechanism affords a very simple control of the spot lamp such as will permit a substantially universal selection of the direction of the beam from said lamp.

What I claim is:

1. A lamp control mechanism comprising a tubular shaft, a second shaft rotatable within said tubular shaft, an inner gear fixed on the second shaft, an outer gear meshing with said inner gear, a mounting for said outer gear fixed upon said tubular shaft, an actuating member engaging said outer gear adapted to selectively rotate said gear on its own axis to drive the second shaft or to actuate said outer gear in a planetary travel about the inner gear to drive the tubular shaft through said mounting, a lamp having a directed beam, means mounting said lamp to turn about relatively transverse axes, means for actuating said lamp about one of said axes from the tubular shaft and means for actuating the lamp about the other axis from the second shaft.

2. A lamp control mechanism comprising a tubular shaft, a second shaft rotatable within said tubular shaft, an inner gear fixed upon the second shaft, an outer gear meshing with the inner gear, a housing for said gears fixed upon the tubular shaft and journaling the outer gear, a member engaging the outer gear to selectively rotate said gear about its own axis to drive the second shaft or actuate said outer gear to drive the tubular shaft through said housing, a lamp having a reflector, means mounting said lamp for rotation about relatively transverse axes, means for actuating said lamp about one of said axes from the tubular shaft, and means for actuating said lamp about the other axis from the second shaft.

3. A lamp control mechaism comprising a tubular shaft a second shaft, rotatable within said tubular shaft, means for alternatively rotating said shafts, a lamp having a directed beam, means mounting said lamp for selectively rotating about relatively transverse axes to vary the direction of its beam, and a worm wheel esetablishing a drive to said lamp from the second shaft about one of said axes and a planetary gearing establishing a speed reducing drive to said lamp from the tubular shaft about the other of said axes.

4. A lamp control mechanism comprising a tubular shaft, a second shaft rotatable within said tubular shaft, means for selectively rotating the tubular shaft or second shaft independently of the tubular shaft, a lamp having a directed beam, means mounting said lamp for rotation about relatively transverse axes, means for actuating said lamp about one of said axes from the second shaft, a gear fixed upon the tubular shaft, a concentric stationary internal gear and a planetary pinion meshing with the two first named gears and establishing a drive to said lamp about the other of said axes.

5. A lamp control mechanism comprising a tubular shaft, a second shaft rotatable within said tubular shaft, means for selectively driving the tubular shaft or driving the second shaft independently of the tubular shaft, a housing into which said shafts are extended, a head rotatable upon said housing about the axes of said shafts, a collar within said housing maintaining engagement of said head with said housing, a gearing within said collar for actuating said head rotatively from the tubular shaft, a lamp having a directed beam, means mounting said lamp on said head to turn about an axis transverse to that of said shafts, and means within said head for driving said lamp from the second shaft about the last mentioned axis.

6. A lamp control mechanism comprising a tubular shaft, a second shaft rotatable within said tubular shaft, means for selectively driving a tubular shaft, for driving the second shaft independently of the tubular shaft, a housing into which said shafts are extended, a head rotatable upon said housing about the axis of said shafts, a collar within said housing, means carried by the housing retaining the collar therewithin, a pair of members connecting said collar and head to maintain engagement of the head with the housing, a pair of pinions journaled upon the last named members, a gear upon the tubular shaft meshing with said pinions, an internal gear fixed within said housing and meshing with said pinions, a lamp having a directed beam, means pivoting said lamp upon said head to turn about an axis transverse to that of said head, and means within said head for actuating said head about the last named axis from the second shaft.

In testimony whereof I sign this specification.

WILLIAM F. KOCH.